US005489934A

United States Patent [19]

Hack

[11] Patent Number: 5,489,934

[45] Date of Patent: Feb. 6, 1996

[54] PRINTED WIRE RECORDING TRANSDUCER FOR ELECTROSTATIC PRINTING/PLOTTING APPLICATIONS

[75] Inventor: James R. Hack, Villa Park, Calif.

[73] Assignee: CalComp Inc., Anaheim, Calif.

[21] Appl. No.: 54,551

[22] Filed: May 3, 1993

[51] Int. Cl.[6] .......... G01D 15/06

[52] U.S. Cl. .......... 347/141; 347/148

[58] Field of Search .......... 346/155; 347/141, 347/147, 148

[56] References Cited

U.S. PATENT DOCUMENTS

| | | | |
|---|---|---|---|
| 3,624,661 | 11/1971 | Shebanow | 346/155 |
| 3,718,936 | 2/1973 | Rice, Jr. | 346/155 |
| 3,903,594 | 9/1975 | Koneval | 346/155 |
| 4,165,514 | 8/1979 | Ishima | 346/155 |
| 4,578,615 | 3/1986 | Genovese et al. | 346/108 |
| 4,672,391 | 6/1987 | Hakoyama et al. | 346/76 PH |
| 4,701,670 | 10/1987 | Watanabe et al. | 346/108 |
| 4,859,913 | 8/1989 | Genovese et al. | 346/108 |
| 5,128,697 | 7/1992 | Bibl et al. | 346/155 |
| 5,132,817 | 7/1992 | Inaba | 359/56 |
| 5,148,595 | 9/1992 | Doggett et al. | 346/155 |
| 5,274,401 | 12/1993 | Doggett et al. | 346/155 |
| 5,343,232 | 8/1994 | Ueno | 346/155 |

OTHER PUBLICATIONS

Abstract of JA-63-0137858. "Ion Flow Generating Type Electrostatic Recorder" Takayanagi et al. Jun. 1988.

*Primary Examiner*—Peter S. Wong
*Assistant Examiner*—Randy W. Gibson
*Attorney, Agent, or Firm*—Donald A. Streck; William F. Porter, Jr.

[57] ABSTRACT

A printed wire electrostatic printing transducer having two or more rows of styli together defining the recording stylus configuration and an associated method for producing such a transducer by printed circuit techniques. Provision is made for the integration of counter electrodes and multiplexing circuitry with the transducer in a single package.

13 Claims, 3 Drawing Sheets

PRINTED WIRE RECORDING TRANSDUCER FOR ELECTROSTATIC PRINTING/PLOTTING APPLICATIONS

BACKGROUND OF THE INVENTION

This invention relates to printed wire recording transducers for electrostatic printing/plotting applications.

Prior art constructions of recording transducers for electrostatic printing are costly, have a relatively high interelectrode capacitance, and have an undesirably large stylus size dictated by wire diameter.

Wherefore, it is an object of the present invention to provide an economical means of producing a printed wire recording transducer (image head) using subtractive and/or additive printed wiring technologies.

It is also an object of the present invention to provide such a transducer with counter electrodes embedded within the recording assembly when the recording system employs single side (A.C.) recording technology.

Electrostatic recording processes and technology are well known and understood by those skilled in the art, and are, therefore, not described in detail within this disclosure in the interest of simplicity and the avoidance of redundancy.

SUMMARY OF THE INVENTION

The invention provides a printed wire recording o transducer for electrostatic printing/plotting comprising, at least two printed electrically conductive stylus arrays disposed parallel to one another to form a desired transducer styli configuration, said arrays each consisting of a plurality of printed wires supported on an electrically insulative laminate.

The invention also provides a method of producing a recording transducer for electrostatic printing comprising producing by printed circuit techniques at least two electrically conductive stylus arrays on at least one electrically insulative laminate; disposing said arrays parallel to one another; and displacing said arrays longitudinally relative to one another to produce a desired transducer styli configuration.

DESCRIPTION OF THE DRAWINGS

The invention will now be described, by way of example, with reference to the accompanying drawings, in which.

DETAILED DESCRIPTION OF PREFERRED EMBODIMENTS

The following description details a recording transducer (image head) fabricated entirely of printed wiring processes employing multi-row and/or multi-levels of recording stylus. In addition, a final lamination of external printed wiring boards is included to provide rigidity and electrical connection for corresponding counter electrode segments (required for multiplexing for single side recording purposes).

Figure 1A:
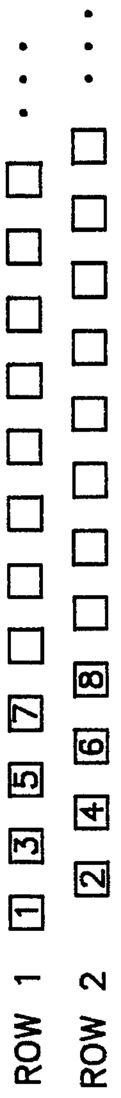
FIG. 1*a* and 1*b* diagrammatically illustrate, respectively, a two- and a four-row stylus configuration of transducers according to the present invention.
Figure 1B:
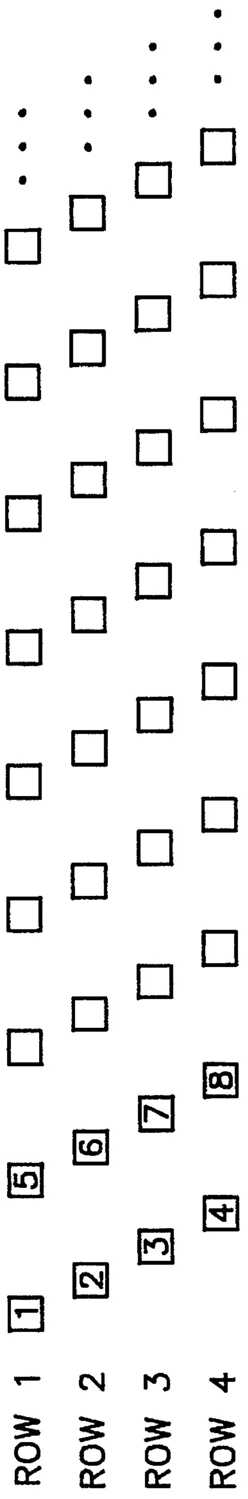

Figures 1*a* and 1*b* serve to define and show graphically the distinction between various stylus configurations as may be applied to this invention. Additional configurations may also be used and should not be excluded from the scope of the present invention. However, for the purposes of this description, the two-row and four-row configurations will be referred to.

Printed circuit layout dictates that the number of stylus points required in a final assembly, and of course the final configuration, be pre-defined. For two-row applications, the number of stylus traces per inch per row layer is one-half of the final configuration, i.e. 400 points per inch divided by 2 or 200 stylus traces per inch per layer. Thus, any number of multi-row configurations require the layer stylus pitch to be related to 1/n times the final points per inch, where n is the number of stylus rows.

Figure 2A:
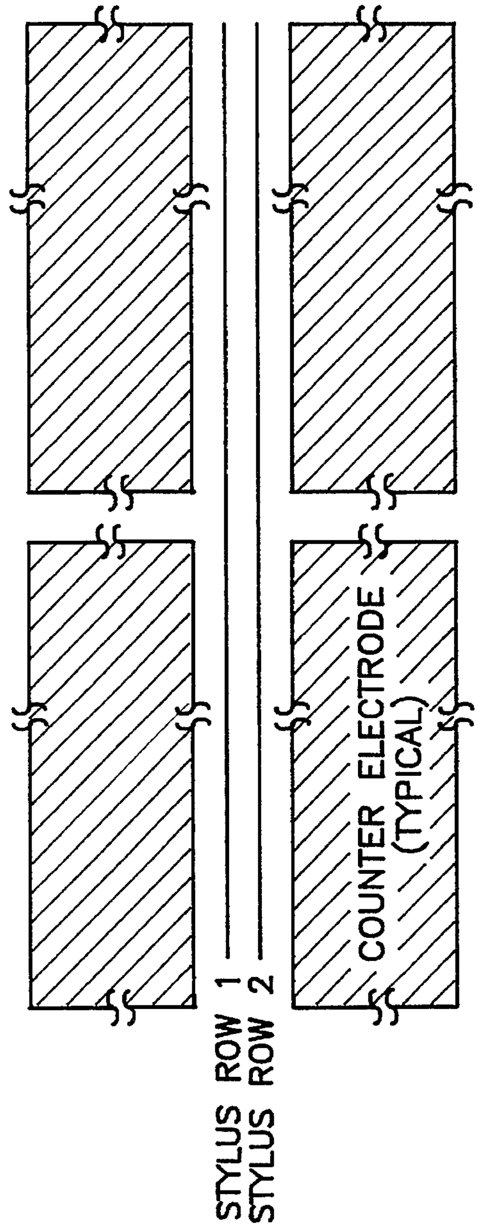
FIGS. 2*a* and 2*b* illustrate a layout for a two-row configuration of a transducer according to FIG. 1*a;*
Figure 3A:
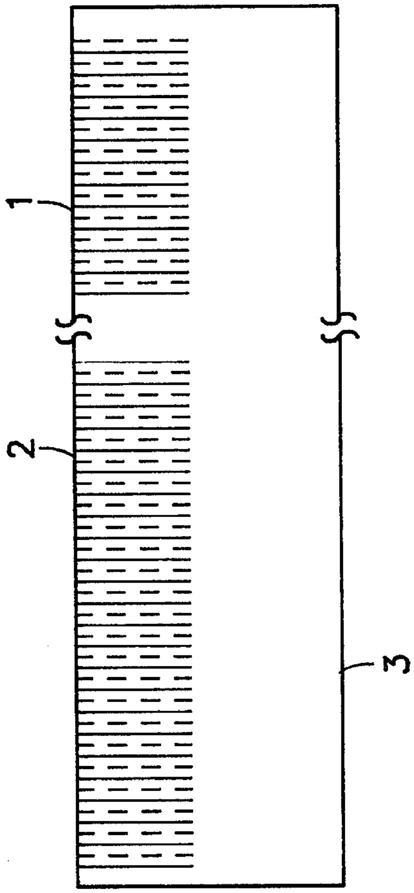
FIGS. 3*a* and 3*b* illustrate photolithographically produced layouts, respectively, for a single assembly and for a multiple assembly produced by a single process.
Figure 3B:
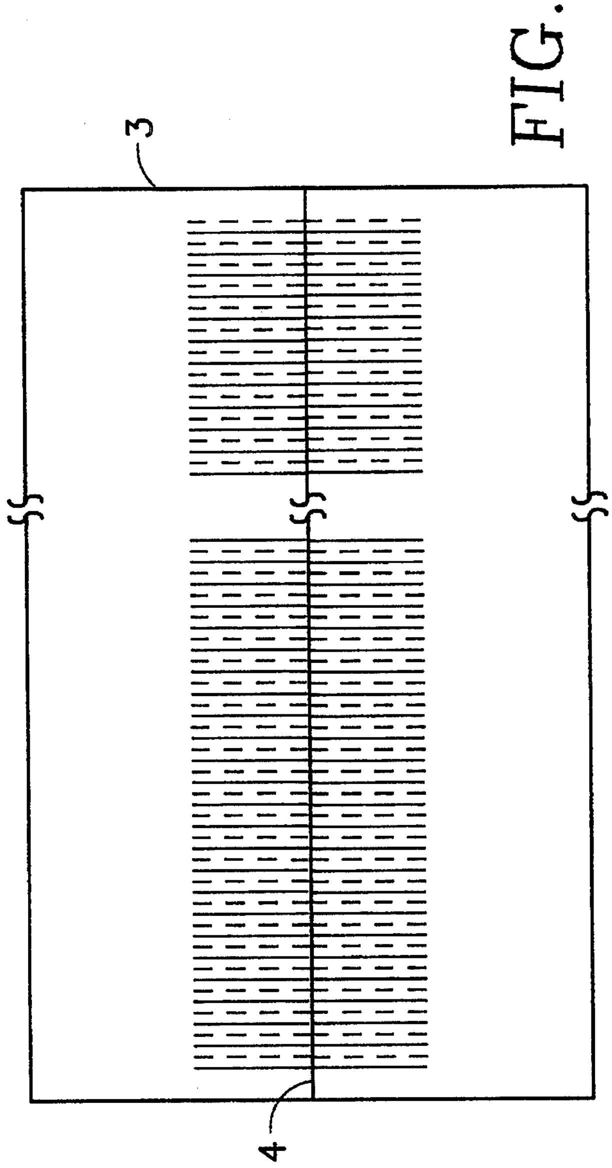
Figure 2B:
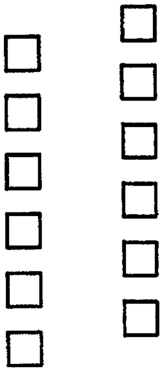

FIGS. 2*a* and 2*b* show a layout for a two-row 400 point per inch configuration. (Construction or core thickness of the printed circuit material is a function of desired row-to-row spacing in the final configuration.) Here, the interstitial registration between the two rows is maintained photolithographically by appropriate tooling and registration targets according to techniques well known to those skilled in the art. As shown, the pitch of the active stylus is 0.005 inch on each row layer, which when viewed in the final assembly equates to 400 points per inch. Artwork is created in such a manner that the front side stylus pattern 1 is shifted one-half pitch or 0.0025 inch in relation to the rear pattern 2 on a printed circuit substrate 3. The direction of shift is dictated as a requirement of the final design (FIG. 3A). FIG. 3B represents a method o by which multiple assemblies can be produced in single processing steps with separation into separate assemblies along a cut line 4 after processing. The physical pattern of the recorded dot is directly related to the size and shape of the stylus conductor pattern in contact with the recording media. Depending upon the recording process in use, the system defines the stylus width-to-thickness relationship. Stylus width is normally chosen so as to create a recorded dot that will give acceptable overlap of adjacent dots, but not so large as to alter s characteristics associated with dot fringing and interference of color dot patterns. In an example cited herein, the stylus is 0.002 inches wide by 0.002 inches thick. This yields a recorded dot of approximately 0.003 inches or a 50% enlargement. Since 400 dots per inch dictates a dot size of 0.0025 inches, there is an acceptable adjacent dot overlap that does not noticeably interfere with color purity yet maintains suitable joining of adjacent dots.

Figure 4A:
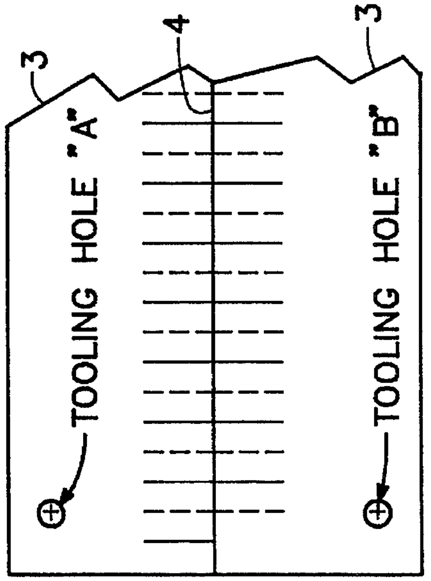
FIGS. 4*a* and 4*b* are, respectively, a fragmentary diagrammatic plan and sectional elevation of a four-row stack configuration.
Figure 4B:
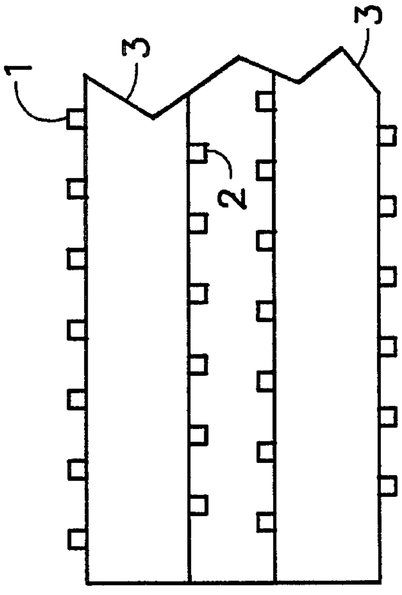

Fabrication of the two-row layer device differs somewhat from the multi-layer in that further fabrication and lamination steps are required for the latter (FIGS. 4*a* and 4*b*). In either case, a common printed circuit approach is utilized. The basic core layers 3 are fabricated using dielectric substrate materials such as epoxy glass, ceramic, glass, etc. A thin layer of conductive material is applied to the dielectric layer, to which a photo resist is next applied. Using conventional photoexposure techniques, the photo resist layer is exposed and developed. Depending upon the system requirements, the final configuration of the recording stylus is then formed. In the case of a four-row stack (FIGS. 4*a* and 4*b*) two P.C. layers each s carrying two layers of stylus pattern are laminated using pre-preg to form a multi-layer assembly defining the final stylus configuration.

If a stylus configuration requiring a unity aspect ratio is needed, an additive plating step is introduced to selectively plate o the traces defined by the photo resist of the initial exposure process. It is necessary that the photo resist, in this case, be of a thickness dictated by the desired thickness of the stylus trace. After plating the stylus traces, the residual photo resist is removed, leaving the plated traces and the base conductive layer. A controlled etching process is used to rapidly etch the unwanted base conductive layer leaving only the plated stylus traces and interconnect traces.

Variation of the method described is reasonable and consistent with well known processes associated with printed circuit fabrication techniques. Multiple layer processing would be similar to that described for two layer, the major difference being increased pitch of the stylus conductor traces and additional processing and alignment of the multiple layers for lamination. FIGS. 4*a* and 4*b* schematically show how these multiple layers are stacked up prior to lamination and after lamination.

Multiplexing of the drive circuit components offers a reduction in the physical number of active electronic switches required for the recording head. In the limit, the maximum number of switches required would be equal to the total number of addressable recording stylus elements or one switch per stylus line. Multiplexing serves to reduce the number of active switches by time-sharing the switches associated with subdivided o stylus groups within the recording head. As an example, if the recording head contained 1,000 stylus elements, the maximum number of high voltage switches would be 1,000. Multiplexing can reduce the number of switches to virtually any desired quantity by grouping. For example, 100 switches can be s employed into one group, thus requiring 10 distinct addresses for each group to accomplish one full raster line recording. Multiplexing connections are made on the printed wiring assembly by means of a second series of connections terminating at defined stylus trace nodes.

The method of connection can be by plated through holes (vias), secondary layers interconnected by blind vias, or additive traces on corresponding dielectric separators. A method described herein is further described in U.S. Pat. No. 4,920,363. Multiplexing interconnections are made over a first application of dielectric insulator, such as (but not limited to) photoimagable dry film of 3–4 mil thickness. Since the film layer is photosensitive, it is exposed to a pattern in registration with the stylus termination pads and processed. After processing, the pad termination areas are accessible through the developed areas in the film layer. These access areas are called vias. The interconnecting layer is now applied either by sputtering conductive material on the dielectric surface and processing with conventional printed circuit techniques or screening a conductive pattern representative of the trace interconnects using conductive "ink" or equivalent.

Depending upon requirements of the system design, a two-row layer recording device can be made without laminating layers. It is made from a single substrate of desired thickness s with the stylus traces photolithographically positioned in register and processed on each side of the substrate. A multi-row layer assembly requires laminating of the inner layers in proper registration to achieve the desired stylus position required for data addressing and recording.

Figure 5:
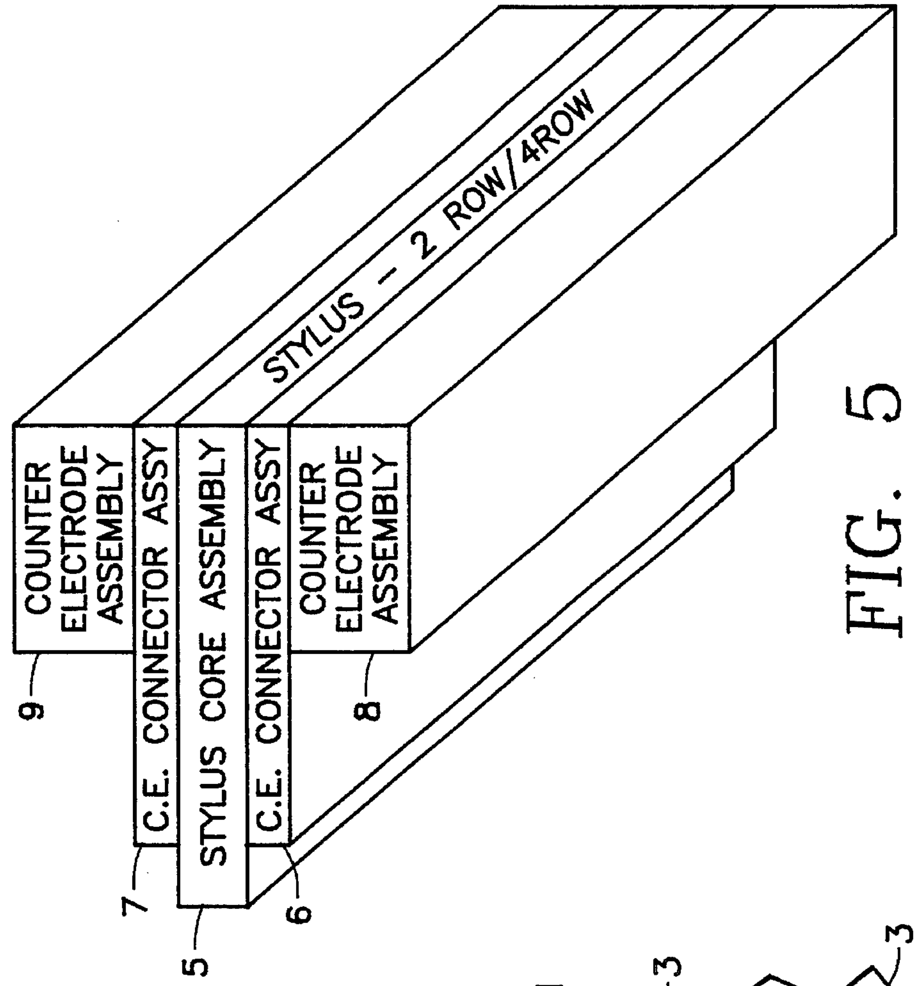
FIG. 5 shows a typical assembly with stylus core assembly, secondary outer assemblies and counter electrode assemblies laminated together to form a unitary structure.

Referring to FIG. 5, after assembly of the stylus inner core structures as previously described, a secondary outer assembly 6 and 7 is laminated to each side of the inner core. This secondary assembly is provided for structure support and rigidity as well, when required, as a method to interconnect s multiplexing counter electrodes 8 and 9.

These secondary outer assemblies 6 and 7 are easily fabricated from standard epoxy glass laminate or equivalent. The thickness of the laminate governs the spacing or separation of the counter electrode elements 8 and 9 from the stylus electrodes. As a matter of practice, this spacing is desired to be from 0.012 to 0.018 inches. The attachment of the secondary outer assemblies is applicable to any inner core assembly regardless of the number of stylus row layers.

As a final assembly process, the conductive counter electrodes 8 and 9, when required, are attached to the secondary outer assemblies by a suitable means, such as conductive epoxy adhesive or soldering. Attachment by a nonconductive adhesive is also applicable, however, another discrete wire attachment is then required to achieve electrical connection to the outer layer conductive trace pad.

Upon completion of the counter electrode attachment, the assembly is molded with a non-conductive rigid material such as two-part epoxy or equivalent to conform to appropriate mechanical design requirements. Final cutting, grinding, and surface polishing of the stylus or stylus/counter electrode surface completes the fabrication of the printed wiring electrostatic recording transducer.

Wherefore, having thus described the present invention, what is claimed is:

1. A printed wire recording transducer for electrostatic printing/plotting comprising:

n pairs of printed electrically conductive stylus arrays, n being an integer at least equal to 2, said pairs of arrays consisting of a first array and a second array each formed by a plurality of parallel printed styli produced on opposite faces of an electrically insulative substrate, the styli of the first array being parallel to the styli of the second array; and wherein, each substrate is stacked and supported together such that the styli of adjacent arrays of two adjacent substrates are parallel to and electrically isolated from one another;

the styli of the first array on each substrate are offset relative to the styli of the second array on the substrate in a same direction perpendicular to the styli of the arrays; and, each of said pairs of arrays is sequentially offset from an adjacent pair of arrays in the same direction as the offset between the styli of first and second arrays on each substrate.

2. The printed wire recording transducer according to claim 1, wherein:

the styli of the first array in each pair of arrays are spaced apart, centerline-to-centerline, a distance 2n times a desired centerline-to-centerline spacing between the styli of adjacent arrays of two adjacent substrates;

the styli of the second array in each pair of arrays are spaced apart, centerline-to-centerline, a distance 2n times a desired centerline-to-centerline spacing between the styli of adjacent arrays of two adjacent substrates;

the offset between the styli of the first array on each substrate relative to the styli of the second array is a distance approximately equal to n times the desired centerline-to-centerline spacing; and, the offset between said pairs of arrays is approximately equal to the desired centerline-to-centerline spacing.

3. The printed wire recording transducer according to claim 2, wherein:

n is equal to 2.

4. A printed wire recording transducer according to claim 1 wherein the transducer is integrated with and sandwiched between electrical printed circuits adding desired rigidity to the transducer and providing electrical connection with counter electrode segments which are also integrated with the transducer in a unitary package.

5. A printed wire recording transducer according to claim 1 wherein the transducer is integral with and sandwiched between rigidizing insulative boards.

6. A printed wire recording transducer according to claim 1 wherein the stylus thickness is determined by the thickness of the printed plating to produce the styli.

7. A method of producing a recording transducer for electrostatic printing comprising the steps of:

producing by printed circuit techniques n pairs of printed electrically conductive stylus arrays, n being an integer at least equal to 2, said pairs of arrays consisting of a first array and a second array each comprising a plurality of parallel printed styli formed on opposite faces of an electrically insulative substrate, the styli of the first array being parallel to the styli of the second array;

stacking and supporting each substrate such that the styli of adjacent arrays of two adjacent substrates are parallel to and electrically isolated from one another;

offsetting the styli of the first array on each substrate from the styli of the second array on the substrate, said offsetting being in a same direction which is perpendicular to the styli of the arrays; and, sequentially offsetting each of said pairs of arrays from an adjacent pair of arrays in the same direction as the offset between the styli of first and second arrays on each substrate.

8. The method according to claim 7 wherein:

the step of producing n pairs of printed electrically conductive stylus arrays comprises the steps of, spacing the styli of the first array in each pair of arrays, centerline-to-centerline, a distance 2n times a desired centerline-to-centerline spacing between the styli of adjacent arrays of two adjacent substrates, and spacing the styli of the second array in each pair of arrays, centerline-to-centerline, a distance 2n times a desired centerline-to-centerline spacing between the styli of adjacent arrays of two adjacent substrates;

the step of offsetting the styli of the first array on each substrate from the styli of the second array on the substrate comprises offsetting the respective styli a distance approximately equal to n times the desired centerline-to-centerline spacing; and, the step of sequentially offsetting each of said pairs of arrays from an adjacent pair of arrays comprises offsetting said pairs of arrays a distance approximately equal to the desired centerline-to-centerline spacing.

9. The method according to claim 8 wherein:

n is equal to 2.

10. A method according to claim 7 comprising integrating the transducer with and sandwiching the transducer between electrical printed circuits to add desired rigidity to the transducer and to provide electrical connection with counter electrode segments, and integrating such segments with the transducer in a unitary package.

11. A method according to claim 7 comprising integrating the transducer with and sandwiching the transducer between rigidizing insulative boards.

12. A method according to claim 7 comprising determining the stylus thickness by the thickness of the printed plating to produce the styli.

13. A method according to claim 7 comprising producing four such arrays as two pairs of arrays, each pair being produced on opposite faces of a said substrate, the substrates then being stacked and supported together.

* * * * *